United States Patent Office 2,868,951
Patented Jan. 13, 1959

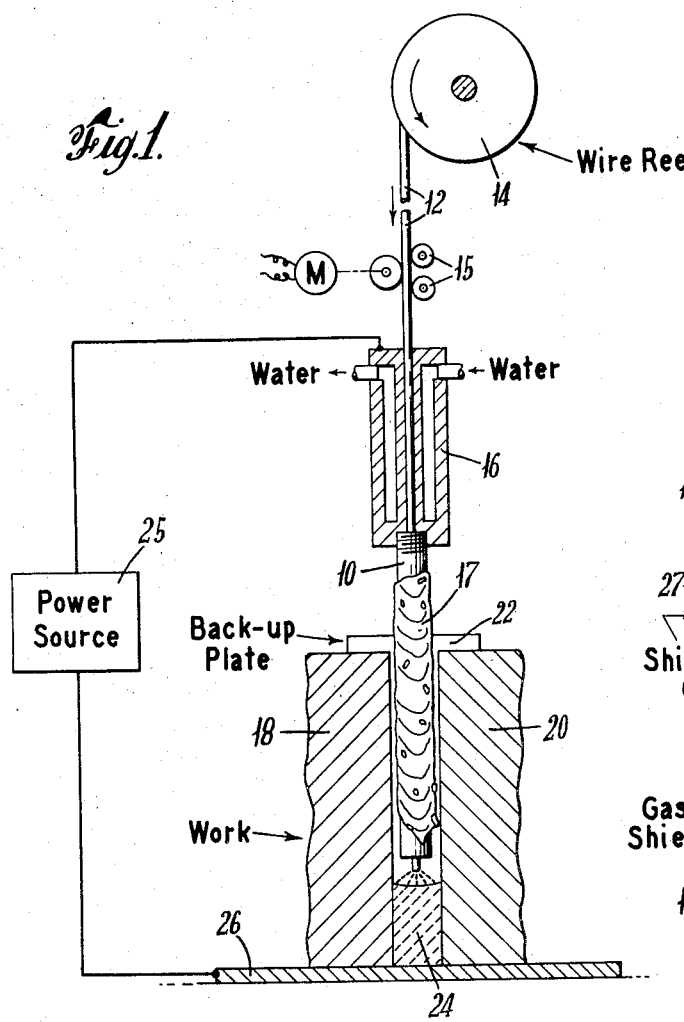
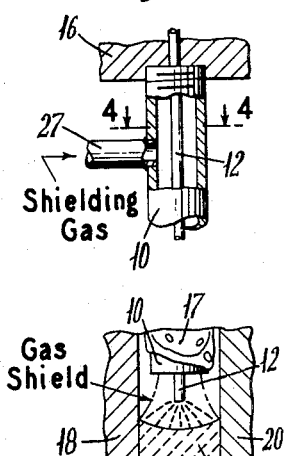
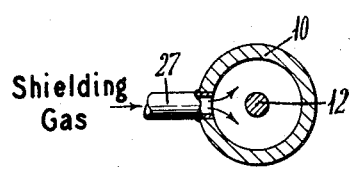
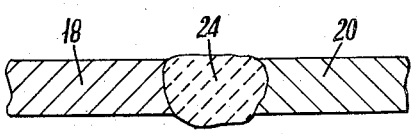

2,868,951

VERTICAL WELDING WITH CONSUMABLE GUIDE TUBE

Harry I. Shrubsall, Scotch Plains, N. J., assignor to Union Carbide Corporation, a corporation of New York Application March 15, 1957, Serial No. 646,285

3 Claims. (Cl. 219—74)

This invention relates to vertical welding with a consumable guide tube and more particularly to processes of this character in which the guide tube is coated with flux compositions.

Submerged arc welds are difficult to make in the vertical position due to the fluidity of the weld metal and molten composition. Present techniques require the use of the slow stringer bead technique using small wires and low currents. Complicated apparatus for restraint of the weld puddle and movement of the welding bead is also required.

The main objects of the present invention are to avoid these difficulties and to simplify apparatus requirements and increase overall welding speeds by producing single pass welds. Its use would be of particular advantage in the field erection of storage tanks and similar applications.

The process according to the present invention employs a stationary consumable welding wire guide tube through which the welding wire passes on its way to the weld zone and in which the welding current is introduced to the welding wire. The guide tube has an external layer or coating of insulating material which insulates it from electrical contact with the weldment. The coating preferably becomes the fluxing agent for the weld puddle as the end of the assembly melts in the weld zone. The guide tube also provides weld metal as it is consumed.

In operation, the guide tube assembly is placed between the spaced edges of the weldment. Suitable restraining bars are clamped to the outside surfaces of the weldment to form a closed area. The welding wire is then fed through the guide tube until it emerges at the bottom. An arc is established and the wire guide tube is progressively consumed together with the wire. The level of the weld continues to rise as metal is added to the weld puddle. The puddle is contained in the cavity formed by the two sections of the weldment and the two restraining bars.

In the drawings:

Figure 1 is an elevation, partly in section of apparatus for carrying out the method according to the preferred embodiment of the present invention;

Figure 2 is a cross section through the completed weld;

Figure 3 is a partial section of the top of the guide tube, showing a modification;

Figure 4 is a horizontal section taken along the line 4—4 of Figure 3; and

Figure 5 is a partial section of the bottom of the modified guide tube.

The apparatus shown in Figure 1 comprises a stationary guide tube 10 through which passes the welding wire 12 supplied from a wire reel 14. The wire is fed by feed rolls 15 driven by a motor M, and passes through a water jacketed bus bar or contact assembly 16 into and through the guide tube.

The guide tube 10 has an external coating 17 in the form of a cast layer or a wrapping which insulates it from electrical contact with the weldment, and preferably becomes a fluxing agent for the weld puddle as the end of the assembly melts in the weld zone. The composition of this coating is preferably water glass and composition according to Miller Patent No. 2,228,639. However, a wrapping of fiber glass tape or abestos tape, or a preformed tube of similar ceramic material may be used.

The guide tube 10 is placed between the parallel spaced edges of the parts 18 and 20 of the metal to be welded. Suitable restraining bars 22 are clamped to the outside surfaces of the weldment to form a closed area. These bars are preferably of copper or other back up material, but steel bars which become a part of the finished weld may be used.

A suitable source 25 of welding current has one terminal connected to the bus bar or contact assembly 16, and energizes the contact tube 10 and the welding wire 12. The other terminal of the source 25 is connected to an end or bottom plate 26 contacting the starting ends of the parts 18 and 20.

In operation the welding wire 12 is fed through the guide tube 10 until it emerges at the bottom or starting end of the edges to be welded. The insulation 17 prevents arcing between the tube 10 and the weldment above the bottom of the tube. An arc is established by any conventional starting method between the end of the welding wire 12 and the bottom plate 26 or the lower ends of the parts 18 and 20, and the guide tube 10 is progressively consumed together with the wire. The insulation 17 generally melts and floats on top of the welding puddle 24. The puddle is contained in the cavity formed by the two sections 18 and 20 of the weldment and the two restraining bars 22.

In the modification shown in Figures 3, 4 and 5, an inlet 27 is provided for a shielding gas such as argon, hydrogen or carbon dioxide as the shielding and arc stabilizing medium. The shielding gas passes down inside the tube 10 and outside the welding wire 12 and fills the space confined by the parts 18 and 20 and the back up plates 22, so as to shield the arc and weld puddle 24.

EXAMPLES

Steel plates, ¾" thick and 12" long, were joined as shown in the drawings. Welding data for this weld were approximately: 600 amps. D. C. R. P., 35 volts. The wire guide tube consisted of a single length of ⅛" I. P. S. steel pipe coated with a mixture of water glass and composition according to Patent 2,228,639 to Miller. Quarter inch dia. wire was fed into the wire guide tube using a mechanical wire feeder. The plates were spaced approximately ¾" apart and backed with copper to form the weld cavity. Physical test data were established for the welds through all-weld-metal 0.505 type tensile specimens and free bend coupons. Typical test results were as follows:

Tensile test data

| Specimen No. | 0.505 As-Welded All Weld Metal Tensile Specimens | | |
|---|---|---|---|
| | Yield Str., p. s. i. | Ult. Tens. Str., p. s. i. | Percent El., 2 in. |
| A | 56,000 | 77,800 | |
| B | 56,700 | 79,400 | 25 |

Free bend test data

| Specimen No.: | [1] Percent El., 2 in. |
|---|---|
| 1A | 42.7 |
| 1B | 34.4 |
| 2A | 34.7 |
| 2B | 31.6 |

[1] Note.—No fracture.

Additional tests were conducted welding 2″ thick steel plates 12″ long. Two wire guide tubes, consisting of two lengths of ⅛″ I. P. S. pipes on ½″ centers and coated with a mixture of water glass and composition according to Miller Patent 2,228,639 were connected in electrical parallel for this weld. The two welding wires used were ³⁄₁₆″ diameter. The welding conditions for the weld were: 680 amps. D. C. R. P., 40 volts, 1.4 I. P. M. vertical rise of weld metal, and plates spaced 11⁄16″ apart.

The test welds were confined to steel plates 12″ in length and 2″ or under in thickness. However, this process can be used with equal success with: any material normally welded with the submerged arc process; welds of any useful length (such as 4′); and, through the addition of multiple wires and/or lateral movement or oscillation of the wire guide tubes, any thickness of material. In addition to the D. C. R. P. power source used in the laboratory tests, this welding technique can also be used with A. C., D. C., constant-potential and multiphase power supplies.

What is claimed is:

1. Method of electric arc welding which comprises positioning the members to be welded with their edges in parallel spaced relation, positioning in the space between said edges a stationary consumable guide tube having an external coating to insulate it from the weldment and act as a fluxing agent for the weld puddle, positioning restraining members against the outside surfaces of the weldment to form a cavity enclosing said guide tube, passing a consumable welding wire through one end of the guide tube until it emerges at the other end thereof, striking an arc between the emerged end of the welding wire and the adjacent end of at least one of said edges, progressively consuming said guide tube with the wire to form a weld puddle in said cavity between said edges and between said restraining members, the extent of weld metal laid down continuing to increase as metal from the wire and tube is added to the weld puddle.

2. Method of vertical welding, which comprises positioning the members to be welded with their edges vertical and in horizontally spaced relation, positioning vertically in the space between said edges a stationary consumable guide tube having an external coating to insulate it from the weldment and act as a fluxing agent for the weld puddle, positioning restraining members against the outside surfaces of the weldment to form a cavity enclosing said guide tube, passing a consumable welding wire down through said guide tube until it emerges at the bottom, striking an arc between the emerged end of the welding wire and the bottom of at least one of said edges, progressively consuming the guide tube with the wire to form a weld puddle in said cavity between said edges and between said restraining members, the level of the weld continuing to rise as metal from the wire and tube is added to the weld puddle.

3. Method of gas shielded electric arc welding which comprises positioning the members to be welded with their edges in parallel spaced relation, positioning in the space between said edges a stationary consumable guide tube having an external coating to insulate it from the weldment and act as a fluxing agent for the weld puddle, positioning restraining members against the outside surfaces of the weldment to form a cavity enclosing said guide tube, passing a consumable welding wire through one end of the guide tube until it emerges at the other end thereof, passing a stream of shielding gas through said guide tube along with the consumable welding wire, striking a gas shielded arc between the emerged end of the welding wire and the adjacent end of at least one of said edges, progressively consuming said guide tube with the wire to form a gas shielded weld puddle in said cavity between said edges and between said restraining members, the extent of weld metal laid down continuing to increase as metal from the wire and tube is added to the weld puddle.

References Cited in the file of this patent

UNITED STATES PATENTS

| 1,356,468 | Peters | Oct. 19, 1920 |
| 2,121,693 | Henderson | June 21, 1938 |
| 2,446,598 | Klinke | Aug. 10, 1941 |
| 2,489,002 | Babbitt | Nov. 22, 1949 |